United States Patent
Wan et al.

(10) Patent No.: US 8,693,441 B2
(45) Date of Patent: Apr. 8, 2014

(54) METHOD AND USER EQUIPMENT FOR FEEDING BACK MULTI-CELL CHANNEL STATE INFORMATION

(75) Inventors: Lei Wan, Shenzhen (CN); Liang Xia, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 13/546,942

(22) Filed: Jul. 11, 2012

(65) Prior Publication Data

US 2012/0275420 A1 Nov. 1, 2012

Related U.S. Application Data

(63) Continuation of application No. PCT/CN2011/070312, filed on Jan. 17, 2011.

(30) Foreign Application Priority Data

Jan. 15, 2010 (CN) .......................... 2010 1 0004812

(51) Int. Cl.
*H04B 7/185* (2006.01)

(52) U.S. Cl.
USPC .......................................... 370/332; 370/252

(58) Field of Classification Search
USPC .......................................... 370/252, 310, 332
See application file for complete search history.

(56) References Cited

U.S. PATENT DOCUMENTS

| | | | | |
|---|---|---|---|---|
| 6,671,499 B1 * | 12/2003 | Ylitalo et al. | .................. | 455/101 |
| 7,844,010 B2 * | 11/2010 | Ylitalo et al. | .................. | 375/267 |
| 7,848,706 B2 * | 12/2010 | Vilzmann et al. | ............ | 455/63.1 |
| 7,953,176 B2 | 5/2011 | Roh | | |
| 8,081,575 B2 * | 12/2011 | Habetha | ........................ | 370/252 |
| 8,116,253 B2 * | 2/2012 | Anderson | ..................... | 370/318 |
| 8,149,791 B2 * | 4/2012 | Li et al. | ......................... | 370/334 |
| 8,446,882 B2 * | 5/2013 | Lee et al. | ...................... | 370/335 |

(Continued)

FOREIGN PATENT DOCUMENTS

| | | |
|---|---|---|
| CN | 101257367 | 9/2008 |
| CN | 101272596 A | 9/2008 |

(Continued)

OTHER PUBLICATIONS

International Search Report received in Patent Cooperation Treaty Application No. PCT/CN2011/070312, mailed Apr. 28, 2011, 3 pages.
Written Opinion of the International Searching Authority received in Patent Cooperation Treaty Application No. PCT/CN2011/070312, mailed Apr. 28, 2011, 3 pages.
Extended European Search Report received in Application No. 11732684.3-1246, Applicant: Huawei Technologies Co., Ltd., mailed Jan. 24, 2013, 8 pages.

(Continued)

*Primary Examiner* — Jay P Patel
(74) *Attorney, Agent, or Firm* — Slater & Matsil, L.L.P.

(57) ABSTRACT

Embodiments of the present invention provide a method and user equipment for feeding back multi-cell channel state information. The method for feeding back multi-cell channel state information includes: feeding back channel state information of a serving cell of a user equipment to a network device; exchanging long-term wideband space state information of a neighboring cell of the user equipment with the network device; feeding back inter-cell additional information of the neighboring cell to the network device, where the inter-cell additional information of the neighboring cell includes a code word that optimizes joint channel information, and the joint channel information is generated according to the channel state information of the serving cell, the long-term wideband space state information of the neighboring cell, and the inter-cell additional information of the neighboring cell.

16 Claims, 3 Drawing Sheets

(56) References Cited

U.S. PATENT DOCUMENTS

| | | | |
|---|---|---|---|
| 2005/0157684 A1* | 7/2005 | Ylitalo et al. | 370/334 |
| 2008/0039046 A1* | 2/2008 | Vilzmann et al. | 455/296 |
| 2008/0242339 A1* | 10/2008 | Anderson | 455/522 |
| 2009/0190528 A1* | 7/2009 | Chung et al. | 370/328 |
| 2010/0002607 A1* | 1/2010 | Kim et al. | 370/280 |
| 2010/0027713 A1 | 2/2010 | Huang et al. | |
| 2010/0054114 A1* | 3/2010 | Li et al. | 370/203 |
| 2010/0220607 A1* | 9/2010 | Fujishima et al. | 370/252 |

FOREIGN PATENT DOCUMENTS

| | | |
|---|---|---|
| CN | 101309520 A | 11/2008 |
| CN | 101341669 A | 1/2009 |
| CN | 101442711 A | 5/2009 |
| WO | WO 2009/084904 A2 | 7/2009 |

OTHER PUBLICATIONS

Huawei, "Hierarchical Feedback Scheme for Single-cell MIMO to Multi-cell MIMO," 3GPP TSG RAN WG1 meeting #59, R1-094714, Jeju, Korea, Nov. 9-13, 2009, 6 pages.

Huawei, "Hierarchical Feedback from Single-cell MIMO to Multi-cell MIMO," 3GPP TSG WG1 meeting #59bis, R1-100257, Valencia, Spain, Jan. 18-22, 2010, 6 pages.

Huawei, "Feedback framework consideration for single cell MIMO," 3GPP TSG RAN WG1 meeting #59, R1-094713, Jeju, Korea, Nov. 9-13, 2009, 4 pages.

NTT DOCOMO, "Views on Sclable CSI Feedback for DL CoMP in LTE-Advanced," 3GPP TSG RAN WG1 Meeting #58bis, R1-094243, Miyazaki, Japan, Oct. 12-16, 2009, 6 pages.

Chinese Search Report received in Application No. 201010004812.5 mailed Mar. 22, 2013, 2 pages.

* cited by examiner

METHOD AND USER EQUIPMENT FOR FEEDING BACK MULTI-CELL CHANNEL STATE INFORMATION

This application is a continuation of co-pending International Application No. PCT/CN2011/070312, filed Jan. 17, 2011, which designated the United States and was not published in English, and which claims priority to Chinese Application No. 201010004812.5, filed Jan. 15, 2010, both of which applications are incorporated herein by reference.

TECHNICAL FIELD

The present invention relates to the field of wireless communication technologies, and in particular, to a method and user equipment for feeding back multi-cell channel state information.

BACKGROUND

To obtain a higher user throughput, a coordinated multiple point transmission and reception (Coordinated Multiple Point transmission and reception, CoMP) technology and a multiple-user multiple-input multiple-output (Multiple-User Multiple-Input Multiple-Output, MU-MIMO) technology may be used in a communication system.

The CoMP technology refers to that multiple access points that are geographically separated provide one or multiple user equipments (User Equipment, UE) with data transmission services. For the CoMP technology, a base station needs to use channel state information between the UE and a candidate access point as input information or reference information to complete processes of sending precoding and pairing multiple users.

For a multi-point transmission system with joint processing (Joint Processing, JP), the UE needs to feed back channel state information between the UE and multiple access points, that is, the UE needs to feed back joint channel state information. In a multi-point transmission system, the information fed back by the UE is extended from channel state information between the UE and a single access point to channel state information between the UE and multiple access points, therefore, feedback overheads are increased. If feedback precision needs to be improved, a further increase of feedback overheads may be caused; however, under a condition of low feedback overheads, feedback precision may be greatly affected.

SUMMARY OF THE INVENTION

The embodiment of the present invention provides a method and user equipment for feeding back multi-cell channel state information, so as to reduce overheads of a user equipment in feeding back multi-cell channel state information.

In one aspect, a method for feeding back multi-cell channel state information is provided. Back channel state information of a serving cell of a user equipment is fed back to a network device. Long-term wideband space state information of a neighboring cell of the user equipment is exchanged with the network device. Inter-cell additional information of the neighboring cell is fed back to the network device. The inter-cell additional information of the neighboring cell includes a code word that optimizes joint channel information and the joint channel information is generated according to the channel state information of the serving cell, the long-term wideband space state information of the neighboring cell, and the inter-cell additional information of the neighboring cell.

In one aspect, a user equipment is provided. A transceiving module is configured to feedback channel state information of a serving cell of the user equipment to a network device; to exchange long-term wideband space state information of a neighboring cell of the user equipment with the network device; and to feedback inter-cell additional information of the neighboring cell to the network device. The inter-cell additional information of the neighboring cell includes a code word that optimizes joint channel information. A generating module is configured to generate the joint channel information according to the channel state information of the serving cell, the long-term wideband space state information of the neighboring cell, and the inter-cell additional information of the neighboring cell, and to generate, according to the joint channel information, the code word that optimizes the joint channel information.

The user equipment feeds back the channel state information of the serving cell to the network device, exchanges the long-term wideband space state information of the neighboring cell of the user equipment with the network device, and feeds back the inter-cell additional information of the neighboring cell to the network device; the overheads of feeding back the channel state information of the neighboring cell are divided into two parts, thereby reducing the overheads of the user equipment in feeding back multi-cell channel state information.

BRIEF DESCRIPTION OF THE DRAWINGS

To make the technical solutions in embodiments of the present invention or in the prior art clearer, the accompanying drawings used in the description of the embodiments of the present invention or the prior art are briefly described in the following. Evidently, the accompanying drawings in the following description are only some embodiments of the present invention, and persons of ordinary skill in the art can derive other drawings from such accompanying drawings without creative efforts.

DETAILED DESCRIPTION OF ILLUSTRATIVE EMBODIMENTS

To make the objectives, technical solutions, and advantages of the embodiments of the present invention clearer, the technical solutions of the embodiments of the present invention are described clearly and completely below with reference to the accompanying drawings. Evidently, the embodiments are only part of rather than all of the embodiments of the present invention. Other embodiments derived by persons of ordinary skill in the art based on the embodiments of the present invention without creative efforts should fall within the protection scope of the present invention.

Figure 1:
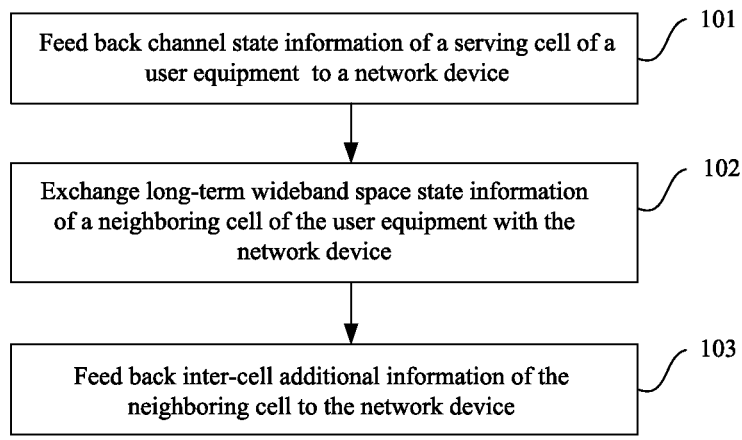
FIG. 1 is a flowchart of an embodiment of a method for feeding back multi-cell channel state information according to the present invention.

FIG. 1 is a flowchart of an embodiment of a method for feeding back multi-cell channel state information according to the present invention. As shown in FIG. 1, this embodiment may be as follows.

101. Feed back channel state information of a serving cell of a user equipment to a network device.

In this embodiment, the network device may be a base station. The user equipment may obtain the channel state information of the serving cell of the user equipment by using a multi-antenna codebook, an adaptive codebook, or differential feedback.

In this embodiment, the user equipment feeds back the channel state information of the serving cell of the user equipment by using single-cell feedback. The channel state information of the serving cell of the user equipment is irrelevant to the channel state information of a neighboring cell of the user equipment.

102. Exchange long-term wideband space state information of a neighboring cell of the user equipment with the network device.

Specifically, the user equipment may feed back the long-term wideband space state information of the neighboring cell of the user equipment to the network device; or, the user equipment may receive the long-term wideband space state information of the neighboring cell of the user equipment that the network device sends through the serving cell of the user equipment.

In this embodiment, the long-term wideband space state information refers to the space state information on all frequency bands within a feedback period that is greater than a first threshold, where the first threshold may be set freely according to system requirements or performance requirements, for example, the first threshold may be set to 100 milliseconds.

103. Feed back inter-cell additional information of the neighboring cell to the network device, where the inter-cell additional information of the neighboring cell includes a code word that optimizes joint channel information, and the joint channel information is generated according to the channel state information of the serving cell, the long-term wideband space state information of the neighboring cell, and the inter-cell additional information of the neighboring cell.

The inter-cell additional information of the neighboring cell is a piece of short-term sub-band feedback information, where the short-term sub-band feedback information refers to the feedback information of some frequency bands within a feedback period that is smaller than a second threshold. The second threshold may be set freely according to system requirements or performance requirements. For example, the second threshold may be 50 milliseconds. The second threshold may be smaller than or equal to the first threshold so long as it is ensured that the feedback period of the inter-cell additional information of the neighboring cell is smaller than the feedback period of the long-term wideband space state information. The optimization of the joint channel information includes: minimum cosine distance or Euclidean distance from ideal channel information, maximum receive signal noise ratio, or maximum receive signal power.

In an implementation of this embodiment, the long-term wideband space state information of the neighboring cell may be: a covariance matrix of the long-term wideband channel state information of the neighboring cell, where the covariance matrix may be a statistics value of the long-term wideband channel state information. In this case, the user equipment may firstly perform eigenvalue decomposition on the covariance matrix of the long-term wideband channel state information of the neighboring cell, and obtain an eigenvalue of the covariance matrix and an eigenvector of the covariance matrix. Then, the user equipment selects a first predetermined quantity of an eigenvalue in descending order from the eigenvalue of the covariance matrix, and obtains an eigenvector corresponding to the first predetermined quantity of the eigenvalue. Finally, the user equipment may generate joint channel information according to the channel state information of the serving cell, a sum of the eigenvalue of the covariance matrix of the channel state information of the serving cell, the first predetermined quantity of the eigenvalue, the eigenvector corresponding to the first predetermined quantity of the eigenvalue, and inter-cell additional information of the neighboring cell; or the user equipment may generate the joint channel information according to the channel state information of the serving cell, the power of the serving cell received by the user equipment, the first predetermined quantity of the eigenvalue, the eigenvector corresponding to the first predetermined quantity of the eigenvalue, and the inter-cell additional information of the neighboring cell.

In another implementation of this embodiment, the long-term wideband space state information of the neighboring cell may be: a second predetermined quantity of an eigenvalue that is selected in descending order from the eigenvalue of the covariance matrix of the long-term wideband channel state information of the neighboring cell and an eigenvector that corresponds to the second predetermined quantity of the eigenvalue. In this case, the user equipment may generate joint channel information according to the channel state information of the serving cell, a sum of the eigenvalue of the covariance matrix of the channel state information of the serving cell, the second predetermined quantity of the eigenvalue, the eigenvector corresponding to the second predetermined quantity of the eigenvalue, and the inter-cell additional information of the neighboring cell; or the user equipment may generate the joint channel information according to the channel state information of the serving cell, the power of the serving cell received by the user equipment, the second predetermined quantity of the eigenvalue, the eigenvector corresponding to the second predetermined quantity of the eigenvalue, and the inter-cell additional information of the neighboring cell.

In still another implementation of this embodiment, the long-term wideband space state information of the neighboring cell may be a weighted covariance matrix of the long-term wideband channel state information of the neighboring cell. In this case, the user equipment may perform eigenvalue decomposition on the weighted covariance matrix of long-term wideband channel state information of the neighboring cell, and obtain an eigenvalue of the weighted covariance matrix and an eigenvector of the weighted covariance matrix. Then, the user equipment may select a third predetermined quantity of an eigenvalue in descending order from the eigenvalue of the weighted covariance matrix; and obtain an eigenvector corresponding to the third predetermined quantity of the eigenvalue. Finally, the user equipment may generate joint channel information according to the channel state information of the serving cell, the third predetermined quantity of the eigenvalue, the eigenvector corresponding to the third predetermined quantity of the eigenvalue, and the inter-cell additional information of the neighboring cell.

In still another implementation of this embodiment, the long-term wideband space state information of the neighboring cell may be: a fourth predetermined quantity of an eigenvalue that is selected in descending order from the eigenvalue of the weighted covariance matrix of the long-term wideband channel state information of the neighboring cell and an eigenvector that corresponds to the fourth predetermined quantity of the eigenvalue. In this case, the user equipment may generate joint channel information according to the channel state information of the serving cell, the fourth predetermined quantity of the eigenvalue, the eigenvector corresponding to the fourth predetermined quantity of the eigenvalue, and the inter-cell additional information of the neighboring cell.

In still another implementation of this embodiment, the long-term wideband space state information of the neighboring cell may be: a direction of arrival (Direction of Arrival, DoA for short) of an uplink that the network device sends through the serving cell of the user equipment. In this case, the user equipment may generate downlink channel space state information according to the direction of arrival of the uplink, and then generate joint channel information according to the channel state information of the serving cell, the downlink channel space state information, the power of the serving cell received by the user equipment, and the inter-cell additional information of the neighboring cell.

In still another implementation of this embodiment, the long-term wideband space state information of the neighboring cell may be: downlink channel space state information that is generated according to the direction of arrival of the uplink and sent by the network device through the serving cell of the user equipment. In this case, the user equipment may generate joint channel information according to the channel state information of the serving cell, the downlink channel space state information, the power of the serving cell received by the user equipment, and the inter-cell additional information of the neighboring cell.

The first predetermined quantity, the second predetermined quantity, the third predetermined quantity, and the fourth predetermined quantity in this embodiment may be the same value or different values.

When the first predetermined quantity, the second predetermined quantity, the third predetermined quantity, and the fourth predetermined quantity are 1 respectively, the above code word that optimizes the joint channel information includes a code word in a codebook that is formed by one constellation map; or when the first predetermined quantity, the second predetermined quantity, the third predetermined quantity, and the fourth predetermined quantity are a value greater than 1, the code word that optimizes the joint channel information includes a code word in a codebook that is formed by one N-antenna single-stream codebook multiplied by one constellation map, where N is equal to the first predetermined quantity, the second predetermined quantity, the third predetermined quantity, or the fourth predetermined quantity.

After receiving the content that the user equipment feeds back in 101 to 103, the network device may generate optimal joint channel information according to the above feedback content.

In the above embodiment, the user equipment feeds back the channel state information of the serving cell to the network device, exchanges the long-term wideband space state information of the neighboring cell of the user equipment with the network device, and feeds back the inter-cell additional information of the neighboring cell to the network device; the overheads of feeding back the channel state information of the neighboring cell are divided into two parts, thereby reducing the overheads of the user equipment in feeding back multi-cell channel state information.

Figure 2:
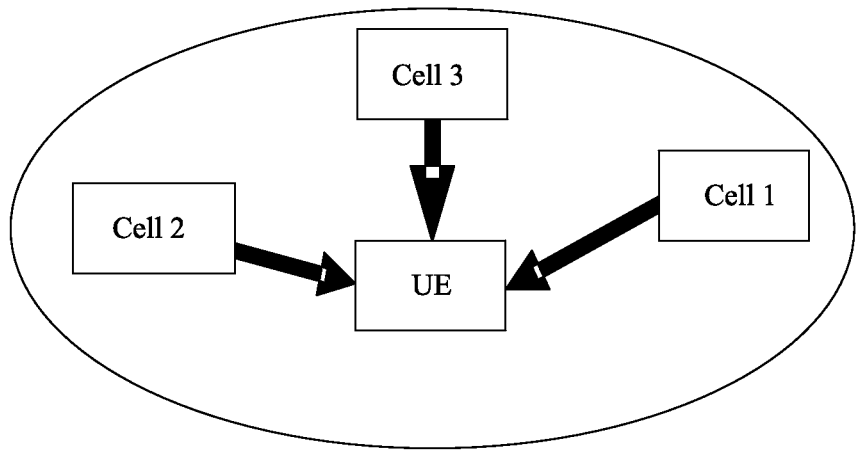
FIG. 2 is a schematic diagram of an application scenario of a method for feeding back multi-cell channel state information according to the present invention.

FIG. 2 is a schematic diagram of an application scenario of a method for feeding back multi-cell channel state information according to the present invention. The application scenario shown in FIG. 2 is a coordinated multi-point transceiving system. As shown in FIG. 2, the coordinated multi-point transceiving system includes: a cell 1, a cell 2, a cell 3, and a UE. The cell 1, the cell 2, and the cell 3 are a reporting cell set of the UE. The cell 1 is the serving cell of the UE, while the cell 2 and the cell 3 are neighboring cells of the UE.

Figure 3:
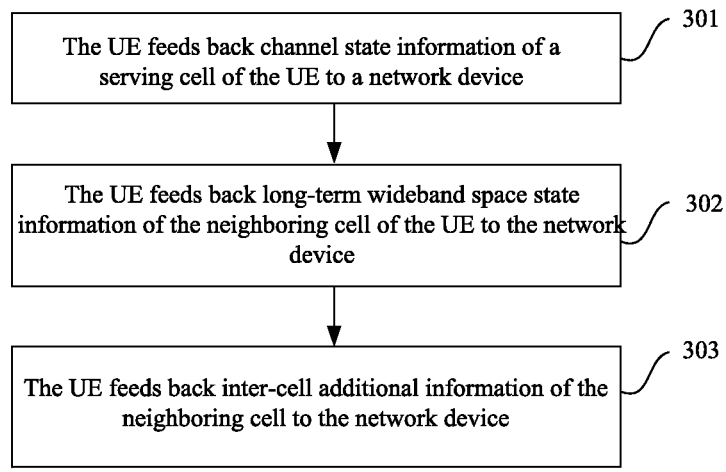
FIG. 3 is a flowchart of another embodiment of a method for feeding back multi-cell channel state information according to the present invention.

FIG. 3 is a flowchart of another embodiment of a method for feeding back multi-cell channel state information according to the present invention. This embodiment describes the method for feeding back multi-cell channel state information in the application scenario shown in FIG. 2 according to the present invention. In this embodiment, the UE needs to feed back the channel state information between the cells in the reporting cell set and the UE. In this embodiment, the channel state information is represented by a downlink channel matrix $H_{i,k}$, where i represents the cell index, and k represents the $k^{th}$ time-frequency resource. It is assumed that the number of transmit antennas of a base station is $N_T$ and the number of receive antennas of the UE is $N_R$. In this embodiment, it is taken as an example that the channel state information of a single data stream is fed back.

As shown in FIG. 3, this embodiment may include following.

301. The UE feeds back channel state information of a serving cell of the UE to a network device.

In this embodiment, the network device may be a base station. The UE may obtain the channel state information $F_1$ of the serving cell of the UE by using a multi-antenna codebook, an adaptive codebook, or differential feedback, where the $F_1$ may be the channel state information of a single data stream of the serving cell of the UE or be the channel state information of at least two data streams of the serving cell of the UE. The number of columns of the $F_1$ corresponds to the number of data streams of the serving cell of the UE.

In this embodiment, the UE feeds back the channel state information of the serving cell of the UE by using single-cell feedback. The channel state information of the serving cell of the UE is irrelevant to the channel state information of a neighboring cell of the UE.

302. The UE feeds back long-term wideband space state information of the neighboring cell of the UE to the network device. In this embodiment, the long-term wideband space state information of the neighboring cell of the UE includes the long-term wideband channel state information of the neighboring cell of the UE.

The long-term wideband channel state information of the neighboring cell may be any one of the following parameters.

(a) A covariance matrix $R_i(i=2, 3)$ of the long-term wideband channel state information of the neighboring cell, where the covariance matrix $R_i$ may be a statistics value of the long-term wideband channel state information, as shown in equation (1).

$$R_i = \frac{1}{K}\sum_{k=1}^{K} H_{i,k}^H H_{i,k}, \quad (1)$$

In the above equation (1), i=2, 3; K represents the total number of time-frequency resources; and $(\cdot)^H$ represents a conjugation transpose operation.

(b) A second predetermined quantity of the eigenvalue $\Sigma_{R_i}^2$ that is selected in descending order from the eigenvalue of the covariance matrix $R_i$ of the long-term wideband channel state information of the neighboring cell and the eigenvector $\nabla_{R_i}$ that correspond to the second predetermined quantity of the eigenvalue $\Sigma_{R_i}^2$, where the second predetermined quantity may be $N_{i,L}$, and $1 \le N_{i,L} \le N_T$. The expression of $R_i$ is as shown in equation (1). The eigenvalue of $R_i$ and the eigenvector of $R_i$ may be obtained by performing eigenvalue decomposition on as shown in equation (2):

$$R_i = V_{R_i} \Sigma_{R_i}^2 \cdot V_{R_i}^H, \qquad (2)$$

In equation (2), $\Sigma_{R_i}^2$ represents an eigenvalue of $R_i$ and $\Sigma_{R_i}^2$ is a diagonal matrix with $N_T$ rows and $N_T$ columns. The diagonal elements in $\Sigma_{R_i}^2$ are arranged in descending order according to the moduli of the diagonal elements; $\bar{\Sigma}_{R_i}^2$ represents the first $N_{i,L}$ rows and $N_{i,L}$ columns of $\Sigma_{R_i}^2$; $V_{R_i}$ represents an eigenspace of $R_i$; $V_{R_i}$ represents a unitary matrix with $N_T$ rows and $N_T$ columns; the $m^{th}$ column of $V_{R_i}$ represents the eigenvector corresponding to the $m^{th}$ diagonal element of $\Sigma_{R_i}^2$, and $\nabla_{R_i}$ represents the first $N_{i,L}$ columns of $V_{R_i}$;

(c) A weighted covariance matrix $\alpha R_i$ (i=2, 3) of the long-term wideband channel state information of the neighboring cell. The weighting factor $\alpha$ may be the reciprocal of a total sum of the eigenvalue of the covariance matrix of the channel state information of the serving cell. An expression of the covariance matrix $R_1$ of the channel state information of the serving cell may be shown as equation (3):

$$R_1 = \frac{1}{K} \sum_{k=1}^{K} H_{1,k}^H H_{1,k}, \qquad (3)$$

In equation (3), K represents the total number of time-frequency resources, and $(\cdot)^H$ represents a conjugation transpose operation. The eigenvalue of $R_i$ and the eigenvector of $R_i$ may be obtained by performing eigenvalue decomposition on $R_i$, as shown in equation (4):

$$R_1 = V_{R_1} \Sigma_{R_1}^2 \cdot V_{R_1}^H, \qquad (4)$$

In equation (4), $\Sigma_{R_1}^2$ represents an eigenvalue of $R_1$, $V_{R_1}$ represents an eigenspace of $R_1$, and the $m^{th}$ column of $V_{R_1}$ represents the eigenvector corresponding to the $m^{th}$ diagonal element of $\Sigma_{R_1}^2$. Therefore, the sum of the eigenvalue of the covariance matrix $R_1$ of the channel state information of the serving cell is $tr(\Sigma_{R_1}^2)$, where tr (A) represents the trace of A. Therefore, $$\alpha = \frac{1}{tr\left(\sum_{R_1}^2\right)}.$$

Definitely, the present invention is not limited thereto, and $\alpha$ may also be a numerical value related to the receive power of the serving cell.

(d) A fourth predetermined quantity of the eigenvalue $\alpha \Sigma_{R_i}^2$ that is selected in descending order from the eigenvalue of the weighted covariance matrix $\alpha R_i$ of the long-term wideband channel state information of the neighboring cell and the eigenvector $\alpha \nabla_{R_i}$ that corresponds to the fourth predetermined quantity of the eigenvalue $\alpha \Sigma_{R_i}^2$, where the fourth predetermined quantity may be $N_{i,L}$, $1 \le N_{i,L} \le N_T$; the selection manner of $\alpha \Sigma_{R_i}^2$ and $\alpha \nabla_{R_i}$ is the same as the selection manner of $\alpha \Sigma_{R_i}^2$ and $\bar{\nabla}_{R_i}$ in (b), and the value of $\alpha$ is the same as the value of $\alpha$ in (c), which are not described herein again.

303. The UE feeds back inter-cell additional information of the neighboring cell to the network device.

In this embodiment, the inter-cell additional information of the neighboring cell is a piece of short-term sub-band feedback information. The inter-cell additional information of the neighboring cell includes a code word that optimizes the joint channel information, where the joint channel information is generated according to the channel state information of the serving cell, the long-term wideband space state information of the neighboring cell, and the above inter-cell additional information of the neighboring cell. The optimization of the joint channel information includes: minimum cosine distance or Euclidean distance from ideal channel information, maximum receive signal noise ratio, or maximum receive signal power.

Specifically, the joint channel information may be generated by using equation (5) according to the inter-cell additional information $W_i$ (i=2, 3) of the neighboring cell and the content fed back in 301 and 302.

$$P = \text{normalize}([\sqrt{D_1} P_1^H \sqrt{D_2} W_2^H P_2^H \sqrt{D_3} W_3^H P_3^H]^H) \qquad (5)$$

In equation (5), $$\text{normalize}(A) = \frac{A}{\sqrt{A^H A}}.$$

Because that the channel state information of a single data stream is fed back is taken as an example in this embodiment, $P_1$ in equation (5) is a first column of the channel state information $F_1$ of the serving cell of the UE fed back in 301.

If the UE feeds back the long-term wideband space state information of the neighboring cell of the UE according to (a) in 302, that is, $R_i$ (i=2, 3) is fed back, the UE may firstly perform eigenvalue decomposition on $R_i$, and obtain the eigenvalue $\Sigma_{R_i}^2$ and the eigenvector $V_{R_i}$ of $R_i$. Then, the UE selects a first predetermined quantity of the eigenvalue in descending order from the eigenvalue $\Sigma_{R_i}^2$ of the covariance matrix, and obtains the eigenvector $\bar{\nabla}_{R_i}$ corresponding to the first predetermined quantity of the eigenvalue. The first predetermined quantity may be $N_{i,L}$, and $1 \le N_{i,L} \le N_T$. $\bar{\Sigma}_{R_i}^2$ represents a first $N_{i,L}$ rows and $N_{i,L}$ columns of $\Sigma_{R_i}^2$ and $\bar{\nabla}_{R_i}$ represents the first $N_{i,L}$ columns of $V_{R_i}$. Therefore, in equation (5), $P_i = \bar{\nabla}_{R_i}$, and $D_i = \bar{\Sigma}_{R_i}^2$, where i=2, 3. $D_1$ may be a sum $tr(\Sigma_{R_1}^2)$ of the eigenvalue of the covariance matrix $R_1$ of the channel state information of the serving cell or the power of the serving cell that is received by the UE. In this case, $D_1$ needs to be fed back by the UE to the serving cell of the UE or be delivered by the network device to the UE through the serving cell of the UE, so that $D_1$ is known by the UE and the serving cell.

If the UE feeds back the long-term wideband space state information of the neighboring cell of the UE according to (b) in 302, that is, $\bar{\Sigma}_{R_i}^2$ and $\bar{\nabla}_{R_i}$ are fed back, then in equation (5), $P_i = \bar{\nabla}_{R_i}$, and $D_i = \bar{\Sigma}_{R_i}^2$, where i=2, 3. $D_1$ may be the total sum $tr(\Sigma_{R_1}^2)$ of the eigenvalue of the covariance matrix $R_1$ of the channel state information of the serving cell$_1$ or the power of the serving cell that is received by the UE. In this case, $D_1$ needs to be fed back by the UE to the serving cell of the UE or be delivered by the network device to the UE through the serving cell of the UE, so that $D_1$ is known by the UE and the serving cell.

If the UE feeds back the long-term wideband space state information of the neighboring cell of the UE according to (c) in 302, that is, $\alpha R_i (i=2, 3)$ is fed back, the UE may firstly perform eigenvalue decomposition on $\alpha R_i$, and obtain the eigenvalue $\alpha \Sigma_{R_i}^2$ and the eigenvector $\alpha V_{R_i}$ of $\alpha R_i$. Then, the UE selects a third predetermined quantity of the eigenvalue $\alpha \Sigma_{R_i}^2$ in descending order from the eigenvalue $\alpha \Sigma_{R_i}^2$ of the covariance matrix, and obtains the eigenvector $\alpha \overline{V}_{R_i}$ corresponding to the third predetermined quantity of the eigenvalue $\alpha \overline{\Sigma}_{R_i}^2$, where the third predetermined quantity may be $N_{i,L}$, and $1 \leq N_{i,L} \leq N_T$. $\alpha \overline{\Sigma}_{R_i}^2$ is the first $N_{i,L}$ rows and $N_{i,L}$ columns of $\alpha \Sigma_{R_i}^2$, and $\alpha \overline{V}_{R_i}$ is the first $N_{i,L}$ columns of $\alpha V_{R_i}$. Therefore, in equation (5), $P_i = \alpha \overline{V}_{R_i}$, and $D_i = \alpha \overline{\Sigma}_{R_i}^2$, where $i=2, 3$. In this case, $D_1$ may be equal to 1.

If the UE feeds back the long-term wideband space state information of the neighboring cell of the UE according to (d) in 302, that is, it feeds back $\alpha \Sigma_{R_i}^2$ and $\alpha V_{R_i}$, then in equation (5), $P_i = \alpha V_{R_i}$, and $D_i = \alpha \Sigma_{R_i}^2$, where $i=2, 3$. In this case, $D_1$ may be equal to 1.

When $W_i(i=2, 3)$ is selected, the UE may select, from the codebook of $W_i(i=2, 3)$, a code word that optimizes the joint channel information of equation (5).

The following describes two methods for constructing the codebook of $W_i(i=2, 3)$.

1. When $N_{i,L}=1$, the codebook of $W_i(i=2, 3)$ may be formed by one constellation map, for example, a 4-bit 16 quadrature amplitude modulation (Quadrature Amplitude Modulation, QAM for short) constellation map shown in equation (6):

$$A = \frac{1}{\sqrt{10}} \begin{Bmatrix} 1+j, 1+3j, 3+j, 3+3j, 1-j, 1-3j, 3-j, 3-3j, -1+j, \\ -1+3j, -3+j, -3+3j, -1-j, -1-3j, -3-3j, -3-3j \end{Bmatrix} \quad (6)$$

2. When $N_{i,L}>1$, the codebook of $W_i(i=2, 3)$ may be formed by one $N_{i,L}$ antenna single-stream codebook multiplied by one constellation map.

For example, when $N_{i,L}=2$, the codebook of $W_i(i=2, 3)$ may be $$W(n) = A\left(\text{floor}\left(\frac{n}{4}\right)\right) \cdot B(\text{mod}(n, 4)),$$

where $n \in \{0, 1, \ldots, 63\}$, and floor$(\cdot)$ represents a round down operation, mod$(\cdot)$ represents a modulo operation; A may be a 4-bit 16QAM constellation map, as shown in equation (6), and B may be a two-antenna single-stream codebook, as shown in equation (7).

$$B = \frac{1}{\sqrt{2}}\left\{\begin{bmatrix}1\\1\end{bmatrix}, \begin{bmatrix}1\\-1\end{bmatrix}, \begin{bmatrix}1\\j\end{bmatrix}, \begin{bmatrix}1\\-j\end{bmatrix}\right\} \quad (7)$$

The above are only two examples of the method for constructing the codebook of $W_i(i=2, 3)$, and the embodiment of the present invention is not limited thereto. A method for constructing the codebook of $W_i(i=2, 3)$ is not limited to the embodiment of the present invention as long as the constructed codebook includes a code word that optimizes the joint channel information in equation (5).

After the base station receives the content that the UE feeds back in 301 to 303, the optimal joint channel information may be obtained according to equation (5).

In this embodiment, 301 and 302 may be performed in any sequence, that is, 301 may be performed first, and then 302 is performed; or 302 may be performed first, and then 301 is performed; or 301 and 302 are performed concurrently.

In the above embodiment, the UE feeds back the channel state information of the serving cell to the network device; feeds back the long-term wideband space state information of the neighboring cell to the network device; and feed back the inter-cell additional information of the neighboring cell to the network device. Through this embodiment, the feedback overheads of the UE for the serving cell are the same as those in a single cell system. For a neighboring cell, feedback overheads are formed by two parts: a covariance matrix of the long-term wideband channel state information or an eigenelement of the covariance matrix, and the short-term sub-band inter-cell additional information. The overheads of feeding back the long-term wideband channel state information are very low, while the overheads of feeding back the short-term sub-band inter-cell additional information may be only four bits according to different requirements and code design book designs. Compared with the solution to feeding back the precoding matrix indicator (Precoding Matrix Indicator, PMI for short) of each cell and inter-cell phase information, the method provided in this embodiment reduces the feedback overheads by 50%.

Figure 4:
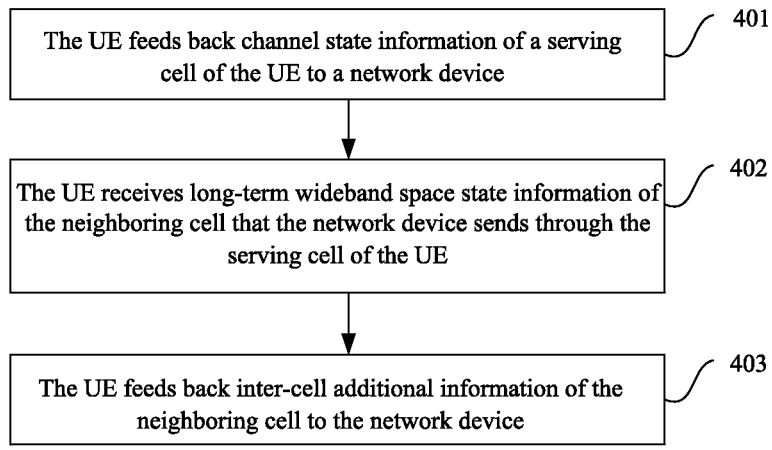
FIG. 4 is a flowchart of another embodiment of a method for feeding back multi-cell channel state information according to the present invention.

FIG. 4 is a flowchart of another embodiment of a method for feeding back multi-cell channel state information according to the present invention. This embodiment describes another method for feeding back multi-cell channel state information in the application scenario shown in FIG. 2. In this embodiment, the UE needs to feed back the channel state information between the cells in the reporting cell set and the UE. In this embodiment, the channel state information is represented by a downlink channel matrix $H_{i,k}$, where i represents the cell index and k represents the $k^{th}$ time-frequency resource. It is assumed that the number of transmit antennas of a base station is $N_T$ and the number of receive antennas of the UE is $N_R$. In this embodiment, it is taken as an example that the channel state information of a single data stream is fed back.

As shown in FIG. 4, this embodiment may include the following:

401. The UE feeds back channel state information of a serving cell of the UE to a network device.

In this embodiment, the network device may be a base station. The UE may obtain the channel state information $F_1$ of the serving cell of the UE by using a multi-antenna codebook, an adaptive codebook, or differential feedback, where the $F_1$ may be the channel state information of a single data stream of the serving cell of the UE or be the channel state information of at least two data streams of the serving cell of the UE. The number of columns of the $F_1$ corresponds to the number of data streams of the serving cell of the UE.

In this embodiment, the UE feeds back the channel state information of the serving cell of the UE by using single-cell feedback. The channel state information of the serving cell of the UE is irrelevant to the channel state information of a neighboring cell of the UE.

402. The UE receives long-term wideband space state information of the neighboring cell of the UE that the network device sends through the serving cell of the UE.

In this embodiment, the long-term wideband space state information of the neighboring cell of the UE is obtained by the network device, and the long-term wideband space state information of the neighboring cell of the UE includes: long-term wideband channel space state information of the neighboring cell that the network device obtains through an uplink pilot or multiple times of feedback from the UE, a direction of arrival of an uplink, or downlink channel space state information generated according to the direction of arrival of the uplink.

The long-term wideband channel state information of the neighboring cell may be any one of the parameters provided in 302 of the embodiment shown in FIG. 3 of the present invention, and is not described herein again.

403. The UE feeds back inter-cell additional information of the neighboring cell to the network device.

In this embodiment, the inter-cell additional information of the neighboring cell is a piece of short-term sub-band feedback information. The inter-cell additional information of the neighboring cell includes a code word that optimizes the joint channel information, where the joint channel information is generated according to the channel state information of the serving cell, the long-term wideband space state information of the neighboring cell, and the above inter-cell additional information of the neighboring cell. The optimization of the joint channel information includes: minimum cosine distance or Euclidean distance from ideal channel information, maximum receive signal noise ratio, or maximum receive signal power.

Specifically, the joint channel information may be generated by using equation (5) according to the inter-cell additional information $W_i$(i=2, 3) of the neighboring cell and the content fed back in 401 and 402.

Because that the channel state information of a single data stream is fed back is taken as an example in this embodiment, $P_1$ in equation (5) is a first column of the channel state information $F_1$ of the serving cell of the UE fed back in 401.

If the long-term wideband space state information of the neighboring cell received by the UE in 402 is the long-term wideband channel state information of the neighboring cell, that is, if the long-term wideband space state information of the neighboring cell received by the UE is the same as the parameters provided in 302 of the embodiment shown in FIG. 3 of the present invention, the values of $D_1, P_2, D_2, P_3, D_3, W_2$, and $W_3$ in equation (5) are the same as those provided in 303 of the embodiment shown in FIG. 3 of the present invention.

If the long-term wideband space state information of the neighboring cell received by the UE in 402 is the direction of arrival of the uplink, the UE firstly generates the downlink channel space state information $P_i$(i=2, 3) according to the direction of arrival of the uplink. $D_i$(i=1, 2, 3) in equation (5) may be the power of the serving cell received by the UE. In this case, $D_1$ needs to be fed back by the UE to the serving cell of the UE or be sent by the network device to the UE through the serving cell of the UE, so that $D_1$ is known by the UE and the serving cell.

If the long-term wideband space state information of the neighboring cell received by the UE in 402 is the downlink channel space state information generated according to the direction of arrival of the uplink, $P_i$ (i=2, 3) in equation (5) is the downlink channel space state information. $D_i$ (i=1, 2, 3) in equation (5) may be the power of the serving cell received by the UE. In this case, $D_1$ needs to be fed back by the UE to the serving cell of the UE or be sent by the network device to the UE through the serving cell of the UE, so that $D_1$ is known by the UE and the serving cell.

In this embodiment, when $W_i$(i=2, 3) is selected, the UE may select, from the codebook of $W_i$(i=2, 3), a code word that optimizes the joint channel information of equation (5). The method for constructing the codebook of $W_i$(i=2, 3) is the same as that provided in 303 of the embodiment shown in FIG. 3 of the present invention, and is not described herein again.

After the base station receives the content that the UE feeds back in 401 and 403, the optimal joint channel information may be obtained according to equation (5).

In this embodiment, 401 and 402 may be performed in any sequence, that is, 401 may be performed first, and then 402 is performed; 402 is performed first, and then 401 is performed; or 401 and 402 may be performed concurrently.

In the above embodiment, the UE feeds back the channel state information of the serving cell to the network device, receives the long-term wideband space state information of the neighboring cell of the UE sent from the network device, and feeds back the inter-cell additional information of the neighboring cell to the network device. Through this embodiment, the network device may send, through the serving cell, the long-term wideband space state information of the neighboring cell to the UE, thereby avoiding that the UE measure and feed back this part of information. Compared with the embodiment shown in FIG. 3 of the present invention, this embodiment further reduces the feedback complexity and the feedback overheads of the UE.

Table 1 shows a gain of CoMP JP relative to Rel.8 multiple-input multiple-output (Multiple-Input Multiple-Output, MIMO for short) by using the method provided in the embodiment shown in FIG. 3 of the present invention. The feedback period of the long-term wideband space state information is 100 milliseconds, and the feedback period of the short-term sub-band inter-cell additional information is 10 milliseconds; the number of transmit antennas is 4; the transmit antenna spacing is 0.5 lambda; and the number of receive antennas is 2, and the receive antenna spacing is 0.5 lambda (lambda).

The emulation scenario is third generation partnership project-case 1 (Generation Partnership Project-Case 1, 3GPP-Case 1 for short). The channel model is spatial channel model (Spatial Channel Model, SCM for short).

TABLE 1

| | Solution to Feeding Back Channel State Information | Feedback Overhead | Average Throughput Gain of the Cell | Edge Throughput Gain of the Cell |
|---|---|---|---|---|
| Rel. 8 MIMO | Current PMI solution | 4 | 0% | 0% |
| CoMP JP | Ideal feedback solution | Inf | 71.96% | 74.60% |
| | Method provided in the embodiment shown in FIG. 3 of the present invention | 4 | 61.65% | 50.61% |

It can be seen from Table 1 that, by using the method provided in the embodiment shown in FIG. 3 of the present invention, the overheads of feeding back the channel state information of the neighboring cell are very low, and meanwhile, it can be ensured that the CoMP JP obtains a big gain. Compared with the CoMP JP using the ideal feedback solution, the CoMP JP using the method provided in the embodiment causes a lower loss of system performance.

The method for feeding back multi-cell channel state information according to the embodiments shown in FIG. 1, FIG. 3, and FIG. 4 of the present invention may be applied to all wireless communication systems that need the feedback of multi-cell joint channel state information. In the embodiments shown in FIG. 3 and FIG. 4 of the present invention, it is taken as an example that the channel state information of a single data stream is fed back. However, the embodiments of the present invention are not limited thereto, and the method for feeding back multi-cell channel state information according to the embodiment of the present invention may also be used to feed back the channel state information of at least two data streams.

Persons of ordinary skill in the art may understand that, all or part of the steps of the method according to the embodiments may be implemented by a program instructing relevant hardware. The program may be stored in a computer readable storage medium. When the program runs, the steps of the method according to the embodiments are performed. The above storage medium may be any medium that is capable of storing program codes, such as a ROM, a RAM, a magnetic disk, or an optical disk.

Figure 5:
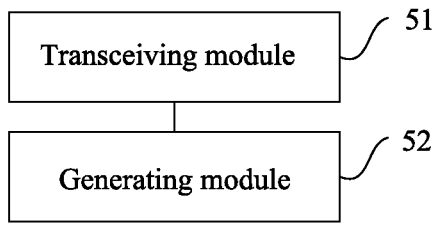
FIG. 5 is a schematic structural diagram of a user equipment according to the present invention.

FIG. 5 is a schematic structural diagram of an embodiment of a user equipment according to the present invention. The user equipment provided in this embodiment may implement the process of the embodiment shown in FIG. 1. As shown in FIG. 5, the user equipment includes a transceiving module 51 and a generating module 52.

The transceiving module 51 is configured to feedback channel state information of a serving cell of the user equipment to a network device; exchange long-term wideband space state information of a neighboring cell of the user equipment with the network device; and feedback inter-cell additional information of the neighboring cell to the network device, where the inter-cell additional information of the neighboring cell includes a code word that optimizes joint channel information.

In this embodiment, the transceiving module 51 feeds back the channel state information of the serving cell of the user equipment by using single-cell feedback, and the channel state information of the serving cell of the user equipment is irrelevant to the channel state information of the neighboring cell of the user equipment.

In this embodiment, the transceiving module 51 may feed back long-term wideband space state information of the neighboring cell of the user equipment to the network device; or, the transceiving module 51 may receive the long-term wideband space state information of the neighboring cell of the user equipment that the network device sends through the serving cell of the user equipment.

The generating module 52 is configured to generate the joint channel information according to the channel state information of the serving cell, the long-term wideband space state information of the neighboring cell, and the inter-cell additional information of the neighboring cell, and generate, according to the joint channel information, the code word that optimizes the joint channel information.

Figure 6:
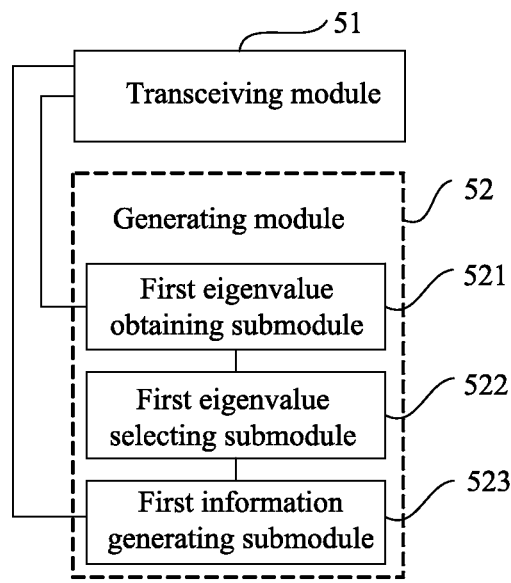
FIG. 6 is another schematic structural diagram of a user equipment according to the present invention.

FIG. 6 is a schematic structural diagram of another embodiment of a user equipment according to the present invention. The user equipment provided in this embodiment may implement the process of the embodiment shown in FIG. 1, FIG. 3, or FIG. 4 of the present invention. Compared with the user equipment shown in FIG. 5, the user equipment shown in FIG. 6 has the following difference. The generating module 52 may include: a first eigenvalue obtaining submodule 521, a first eigenvalue selecting submodule 522, and a first information generating submodule 523.

The first eigenvalue obtaining submodule 521 is configured to perform eigenvalue decomposition on a covariance matrix of long-term wideband channel state information of the neighboring cell, and obtain an eigenvalue of the covariance matrix and an eigenvector of the covariance matrix.

The first eigenvalue selecting submodule 522 is configured to select a fifth predetermined quantity of an eigenvalue in descending order from the eigenvalue that is obtained by the first eigenvalue obtaining submodule 521, and obtain an eigenvector corresponding to the fifth predetermined quantity of the eigenvalue.

The first information generating submodule 523 is configured to generate the joint channel information according to the channel state information of the serving cell, a sum of the eigenvalue of the covariance matrix of the channel state information of the serving cell, the fifth predetermined quantity of the eigenvalue that is selected by the first eigenvalue selecting submodule 522, the eigenvector corresponding to the fifth predetermined quantity of the eigenvalue, and the inter-cell additional information of the neighboring cell; or generate the joint channel information according to the channel state information of the serving cell, power of the serving cell received by the user equipment, the fifth predetermined quantity of the eigenvalue that is selected by the first eigenvalue selecting submodule 522, the eigenvector corresponding to the fifth predetermined quantity of the eigenvalue, and the inter-cell additional information of the neighboring cell.

Figure 7:
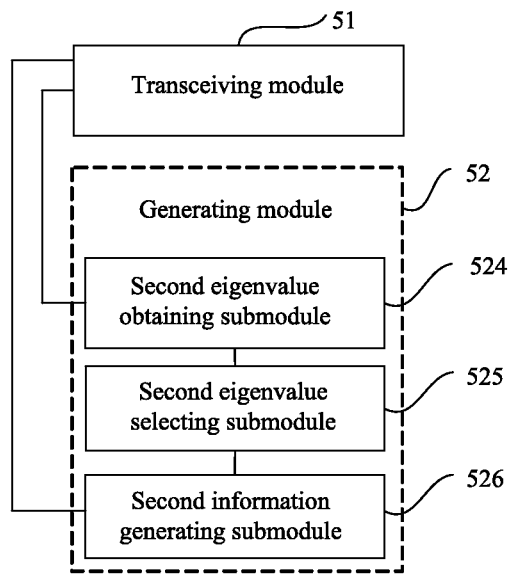
FIG. 7 is another schematic structural diagram of a user equipment according to the present invention.

FIG. 7 is a schematic structural diagram of another embodiment of a user equipment according to the present invention. The user equipment provided in this embodiment may implement the process of the embodiment shown in FIG. 1, FIG. 3, or FIG. 4 of the present invention. Compared with the user equipment shown in FIG. 5, the user equipment shown in FIG. 7 has the following difference. The generating module 52 may include: a second eigenvalue obtaining submodule 524, a second eigenvalue selecting submodule 525, and a second information generating submodule 526.

The second eigenvalue obtaining submodule 524 is configured to perform eigenvalue decomposition on a weighted covariance matrix of long-term wideband channel state information of the neighboring cell, and obtain an eigenvalue of the weighted covariance matrix and an eigenvector of the weighted covariance matrix.

The second eigenvalue selecting submodule 525 is configured to select a sixth predetermined quantity of an eigenvalue in descending order from the eigenvalue that is obtained by the second eigenvalue obtaining submodule 524, and obtain an eigenvector corresponding to the sixth predetermined quantity of the eigenvalue.

The second information generating submodule 526 is configured to generate the joint channel information according to the channel state information of the serving cell, the sixth predetermined quantity of the eigenvalue, the eigenvector corresponding to the sixth predetermined quantity of the eigenvalue, and the inter-cell additional information of the neighboring cell.

Figure 8:
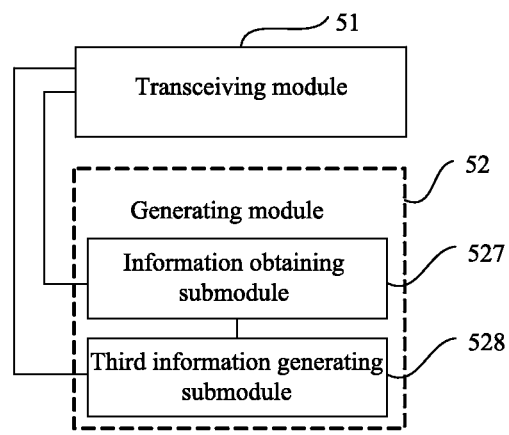
FIG. 8 is another schematic structural diagram of a user equipment according to the present invention.

FIG. 8 is a schematic structural diagram of another embodiment of a user equipment according to the present invention. The user equipment provided in this embodiment may implement the process of the embodiment shown in FIG. 1, FIG. 3, or FIG. 4 of the present invention. Compared with the user equipment shown in FIG. 5, the user equipment shown in FIG. 8 has the following difference. The generating module 52 may include: an information obtaining submodule 527 and a third generating submodule 528.

The information obtaining submodule 527 is configured to generate downlink channel space state information according to a direction of arrival of an uplink that the network device sends through the serving cell of the user equipment; or obtain downlink channel space state information that is generated according to the direction of arrival of the uplink and sent by the network device through the serving cell of the user equipment.

The third information generating submodule 528 is configured to generate the joint channel information according to the channel state information of the serving cell, the downlink channel space state information obtained by the information obtaining submodule 527, power of the serving cell received by the user equipment, and the inter-cell additional information of the neighboring cell.

In the above user equipment, the transceiving module 51 feeds back the channel state information of the serving cell to the network device, exchanges the long-term wideband space state information of the neighboring cell of the user equipment with the network device, and feeds back the inter-cell additional information of the neighboring cell to the network device; the overheads of feeding back the channel state information of the neighboring cell are divided into two parts, thereby reducing the overheads of the user equipment in feeding back multi-cell channel state information.

Figure 9:
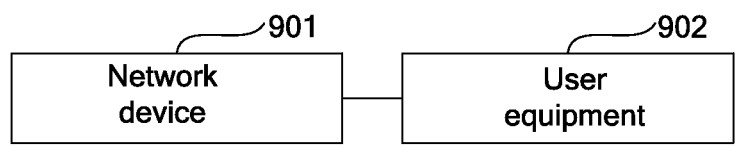
FIG. 9 is another schematic structural diagram of a system for feeding back multi-cell channel state information according to the present invention.

FIG. 9 is a schematic structural diagram of an embodiment of a system for feeding back multi-cell channel state information according to the present invention. As shown in FIG. 9, the system for feeding back multi-cell channel state information may include: a network device 901 and a user equipment 902.

The user equipment 902 is configured to feed back channel state information of a serving cell of the user equipment 902 to the network device 901; exchange long-term wideband space state information of neighboring cell of the user equipment 902 with the network device 901; and feed back the inter-cell additional information of the neighboring cell to the network device 901, where the inter-cell additional information of the neighboring cell includes a code word that optimizes joint channel information, and the joint channel information is generated according to the channel state information of the serving cell, the long-term wideband space state information of the neighboring cell, and the inter-cell additional information of the neighboring cell. Specifically, the user equipment 902 may be implemented by the user equipment shown in FIG. 5, FIG. 6, FIG. 7, or FIG. 8 of the present invention.

In the above embodiment, the user equipment 902 feeds back the channel state information of the serving cell to the network device 901, exchanges the long-term wideband space state information of the neighboring cell of the user equipment 902 with the network device 901, and feeds back the inter-cell additional information of the neighboring cell to the network device 901; the overheads of feeding back the channel state information of the neighboring cell are divided into two parts, thereby reducing the overheads of the user equipment 902 in feeding back multi-cell channel state information.

Those skilled in the art may understand that, the accompanying drawings are merely schematic diagrams of exemplary embodiments and modules or processes in the accompanying drawings are not mandatory for implementing the present invention.

Those skilled in the art understand that the modules of the apparatuses in the embodiments may be distributed in the apparatuses of the embodiments or may be located in one or more apparatuses that are different from the apparatuses in the embodiments. The above modules in the embodiments may be combined into one module, or split into several submodules.

Finally, it should be noted that, the above embodiments are merely provided for describing the technical solutions of the present invention, but not intended to limit the present invention. Although the present invention has been described in detail with reference to the above embodiments, it should be understood by persons of ordinary skill in the art that, modifications may still be made to the technical solutions disclosed in the above embodiments, or equivalent replacements may be made to a part of the technical features therein, and these modifications or replacements do not cause the corresponding technical solutions to depart from the spirit and scope of the embodiments of the present.

What is claimed is:

1. A method for feeding back multi-cell channel state information in a network, the method comprising:
   feeding back, by a user equipment, channel state information of a serving cell of the user equipment to a network device;
   exchanging, by the user equipment, long-term wideband space state information of a neighboring cell of the user equipment with the network device;
   obtaining, by the user equipment, an inter-cell additional information of the neighboring cell;
   selecting, by the user equipment, a code word that optimizes joint channel information, from a codebook of the inter-cell additional information; and
   feeding back, by the user equipment, inter-cell additional information of the neighboring cell to the network device, wherein the inter-cell additional information of the neighboring cell comprises the code word that optimizes the joint channel information, so that the network generates the optimal joint channel information according to the channel state information of the serving cell, the long-term wideband space state information of the neighboring cell, and the code word that optimizes the joint channel information, wherein the optimal joint channel information is minimum cosine distance or Euclidean distance from ideal channel information, maximum receive signal noise ratio, or maximum receive signal power.

2. The method according to claim 1, wherein exchanging, by the user equipment, the long-term wideband space state information of the neighboring cell of the user equipment with the network device comprises:
   feeding back, by the user equipment, the long-term wideband space state information of the neighboring cell to the network device; or
   receiving, by the user equipment, the long-term wideband space state information of the neighboring cell that the network device sends through the serving cell of the user equipment.

3. The method according to claim 2, wherein the long-term wideband wideband space state information of the neighboring cell comprises a covariance matrix of long-term wideband channel state information of the neighboring cell; and wherein the optimal joint channel information is generated by:
performing, by the user equipment, eigenvalue decomposition on the covariance matrix of the long-term wideband channel state information of the neighboring cell, and obtaining an eigenvalue of the covariance matrix and an eigenvector of the covariance matrix;
selecting, by the user equipment, a first predetermined quantity of an eigenvalue in descending order from the eigenvalue of the covariance matrix; and obtaining an eigenvector corresponding to the first predetermined quantity of the eigenvalue; and
generating, by the user equipment, the optimal joint channel information according to the channel state information of the serving cell, a sum of the eigenvalue of the covariance matrix of the channel state information of the serving cell, the first predetermined quantity of the eigenvalue, the eigenvector corresponding to the first predetermined quantity of the eigenvalue, and the code word that optimizes the joint channel information; or
generating, by the user equipment, the optimal joint channel information according to the channel state information of the serving cell, power of the serving cell received by the user equipment, the first predetermined quantity of the eigenvalue, the eigenvector corresponding to the first predetermined quantity of the eigenvalue, and the code word that optimizes the joint channel information.

4. The method according to claim 2, wherein the long-term wideband space state information of the neighboring cell comprises a second predetermined quantity of an eigenvalue that is selected in descending order from an eigenvalue of a covariance matrix of long-term wideband channel state information of the neighboring cell and an eigenvector that corresponds to the second predetermined quantity of the eigenvalue; and
wherein the optimal joint channel information is generated by generating the optimal joint channel information according to the channel state information of the serving cell, a sum of the eigenvalue of the covariance matrix of the channel state information of the serving cell, the second predetermined quantity of the eigenvalue, the eigenvector corresponding to the second predetermined quantity of the eigenvalue, and the code word that optimizes the joint channel information; or generating the optimal joint channel information according to the channel state information of the serving cell, power of the serving cell received by the user equipment, the second predetermined quantity of the eigenvalue, the eigenvector corresponding to the second predetermined quantity of the eigenvalue, and the code word that optimizes the joint channel information.

5. The method according to claim 2, wherein the long-term wideband space state information of the neighboring cell comprises a weighted covariance matrix of long-term wideband channel state information of the neighboring cell; and
wherein the optimal joint channel information is generated by:
performing, by the user equipment, eigenvalue decomposition on the weighted covariance matrix of the long-term wideband channel state information of the neighboring cell, and obtaining an eigenvalue of the weighted covariance matrix and an eigenvector of the weighted covariance matrix;
selecting, by the user equipment, a third predetermined quantity of an eigenvalue in descending order from the eigenvalue of the weighted covariance matrix; and
obtaining an eigenvector corresponding to the third predetermined quantity of the eigenvalue; and
generating, by the user equipment, the optimal joint channel information according to the channel state information of the serving cell, the third predetermined quantity of the eigenvalue, the eigenvector corresponding to the third predetermined quantity of the eigenvalue, and the code word that optimizes the joint channel information.

6. The method according to claim 2, wherein the long-term wideband space state information of the neighboring cell comprises a fourth predetermined quantity of an eigenvalue that is selected in descending order from an eigenvalue of a weighted covariance matrix of long-term wideband channel state information of the neighboring cell and an eigenvector that corresponds to the fourth predetermined quantity of the eigenvalue; and
wherein the optimal joint channel information is generated by generating the optimal joint channel information according to the channel state information of the serving cell, the fourth predetermined quantity of the eigenvalue, the eigenvector corresponding to the fourth predetermined quantity of the eigenvalue, and the code word that optimizes the joint channel information.

7. The method according to claim 2, wherein the long-term wideband space state information of the neighboring cell comprises a direction of arrival of an uplink that the network device sends through the serving cell of the user equipment; and
wherein the optimal joint channel information is generated by:
generating, by the user equipment, downlink channel space state information according to the direction of arrival of the uplink; and
generating, by the user equipment, the optimal joint channel information according to the channel state information of the serving cell, the downlink channel space state information, power of the serving cell received by the user equipment, and the code word that optimizes the joint channel information.

8. The method according to claim 2, wherein the long-term wideband space state information of the neighboring cell comprises downlink channel space state information that is generated according to a direction of arrival of an uplink and sent by the network device through the serving cell of the user equipment; and
wherein the optimal joint channel information is generated by generating the optimal joint channel information according to the channel state information of the serving cell, the downlink channel space state information, power of the serving cell received by the user equipment, and the code word that optimizes the joint channel information.

9. The method according to claim 2, wherein the long-term wideband space state information of the neighboring cell comprises a first covariance matrix and a weighted covariance matrix of long-term wideband channel state information of the neighboring cell; and
wherein the optimal joint channel information is generated by:
determining an eigenvalue of the first covariance matrix and an eigenvalue of the weighted covariance matrix;
determining a first predetermined quantity of a first eigenvalue in descending order from the eigenvalue of the first covariance matrix;

determining a second predetermined quantity of a second eigenvalue in descending order from the eigenvalue of the first covariance matrix;

determining a third predetermined quantity of a third eigenvalue in descending order from the eigenvalue of the weighted covariance matrix; and determining a fourth predetermined quantity of a fourth eigenvalue in descending order from the eigenvalue of the weighted covariance matrix.

10. The method according to claim 9, wherein, when the first predetermined quantity, the second predetermined quantity, the third predetermined quantity, and the fourth predetermined quantity are each equal to 1, the code word that optimizes the joint channel information comprises a first code word in a first codebook that is formed by a constellation map.

11. The method according to claim 9, wherein, when the first predetermined quantity, the second predetermined quantity, the third predetermined quantity, and the fourth predetermined quantity are all greater than 1, the code word that optimizes the joint channel information comprises a first code word in a first codebook that is formed by one N-antenna single-stream codebook multiplied by one constellation map, wherein N is equal to the first predetermined quantity, the second predetermined quantity, the third predetermined quantity, or the fourth predetermined quantity.

12. A user equipment in a network, comprising:
a transmitter, configured to feed back channel state information of a serving cell of the user equipment to a network device, to exchange long-term wideband space state information of a neighboring cell of the user equipment with the network device; and a processor, configured to obtain an inter-cell additional information of the neighboring cell, and select a code word that optimizes joint channel information, from a codebook of the inter-cell additional information;

the transmitter configured to feed back inter-cell additional information of the neighboring cell to the network device, wherein the inter-cell additional information of the neighboring cell comprises the code word that optimizes joint channel information, so that the network generates the optimal joint channel information according to the channel state information of the serving cell, the long-term wideband space state information of the neighboring cell, and the code word that optimizes the joint channel information, and to generate, according to the joint channel information, the code word that optimizes the joint channel information, wherein the optimal joint channel information is minimum cosine distance or Euclidean distance from ideal channel information, maximum receive signal noise ratio, or maximum receive signal power.

13. The user equipment according to claim 12, wherein the processor processor is configured to:
perform eigenvalue decomposition on a covariance matrix of long-term wideband channel state information of the neighboring cell and to obtain an eigenvalue of the covariance matrix and an eigenvector of the covariance matrix;

select a fifth predetermined quantity of an eigenvalue in descending order from the eigenvalue that is obtained when performing the eigenvalue decomposition, and to obtain an eigenvector corresponding to the fifth predetermined quantity of the eigenvalue; and generate the optimal joint channel information according to the channel state information of the serving cell, a sum of the eigenvalue of the covariance matrix of the channel state information of the serving cell, the fifth predetermined quantity of the eigenvalue selected, the eigenvector corresponding to the fifth predetermined quantity of the eigenvalue, and the code word that optimizes the joint channel information; or to generate the optimal joint channel information according to the channel state information of the serving cell, power of the serving cell received by the user equipment, the fifth predetermined quantity of the eigenvalue selected, the eigenvector corresponding to the fifth predetermined quantity of the eigenvalue, and the code word that optimizes the joint channel information.

14. The user equipment according to claim 12, wherein the processor is configured to:
perform eigenvalue decomposition on a weighted covariance matrix of long-term wideband channel state information of the neighboring cell and to obtain an eigenvalue of the weighted covariance matrix and an eigenvector of the weighted covariance matrix;

select a sixth predetermined quantity of an eigenvalue in descending order from the eigenvalue that is obtained by performing the eigenvalue decomposition and to obtain an eigenvector corresponding to the sixth predetermined quantity of the eigenvalue; and generate the optimal joint channel information according to the channel state information of the serving cell, the sixth predetermined quantity of the eigenvalue, the eigenvector corresponding to the sixth predetermined quantity of the eigenvalue, and the code word that optimizes the joint channel information.

15. The user equipment according to claim 12, wherein the processor is configured to:
generate downlink channel space state information according to a direction of arrival of an uplink that the network device sends through the serving cell of the user equipment; or to obtain downlink channel space state information that is generated according to the direction of arrival of the uplink and sent by the network device through the serving cell of the user equipment; and generate the optimal joint channel information according to the channel state information of the serving cell, the downlink channel space state information obtained, power of the serving cell received by the user equipment, and the code word that optimizes the joint channel information.

16. The user equipment, comprising a processor coupled to memory, wherein the processor is programmed to perform the method according to claim 1.

* * * * *

UNITED STATES PATENT AND TRADEMARK OFFICE
CERTIFICATE OF CORRECTION

| | | |
|---|---|---|
| PATENT NO. | : 8,693,441 B2 | Page 1 of 1 |
| APPLICATION NO. | : 13/546942 | |
| DATED | : April 8, 2014 | |
| INVENTOR(S) | : Lei Wan | |

It is certified that error appears in the above-identified patent and that said Letters Patent is hereby corrected as shown below:

In the Claims:

In Col. 16, line 65, claim 3, delete "wideband wideband space" and insert --wideband space--.
In Col. 19, line 53, claim 13, delete "processor processor" and insert --processor--.

Signed and Sealed this
Twenty-fourth Day of June, 2014

Michelle K. Lee
*Deputy Director of the United States Patent and Trademark Office*